(12) United States Patent
Toyooka et al.

(10) Patent No.: US 6,497,516 B1
(45) Date of Patent: Dec. 24, 2002

(54) GUIDE PIN FOR OPTICAL FIBER CONNECTORS AND OPTICAL FIBER CONNECTOR PLUG

(75) Inventors: Hiroyasu Toyooka, Yokohama (JP); Koji Kashihara, Yokohama (JP); Atsushi Takai, Yokohama (JP); Atsushi Miura, Yokohama (JP)

(73) Assignees: Sumitomo Electric Industries, Ltd., Osaka (JP); Hitachi, Ltd., Tokyo (JP)

( * ) Notice: Subject to any disclaimer, the term of this patent is extended or adjusted under 35 U.S.C. 154(b) by 0 days.

(21) Appl. No.: 09/555,566
(22) PCT Filed: Dec. 16, 1998
(86) PCT No.: PCT/JP98/05692
§ 371 (c)(1), (2), (4) Date: Jun. 1, 2000
(87) PCT Pub. No.: WO99/31539
PCT Pub. Date: Jun. 24, 1999

(30) Foreign Application Priority Data

Dec. 17, 1997 (JP) ............................................. 9-347919

(51) Int. Cl.⁷ ................................................ G02B 6/36
(52) U.S. Cl. .......................................... 385/78; 439/352
(58) Field of Search ............................. 385/78, 77, 76, 385/72, 60; 439/352, 378, 374

(56) References Cited

U.S. PATENT DOCUMENTS

| 2,935,724 | A | * | 5/1960 | Siefried et al. ............. 439/352 |
| 3,545,080 | A | * | 12/1970 | Evans |
| 4,964,805 | A | * | 10/1990 | Gabany ..................... 439/434 |
| 4,998,892 | A | * | 3/1991 | Shiley ........................ 439/378 |
| 5,263,880 | A | * | 11/1993 | Schwarz et al. ........... 174/52.2 |
| 5,407,371 | A | * | 4/1995 | Chen |

FOREIGN PATENT DOCUMENTS

| JP | 2-297507 | 12/1990 |
| JP | 4-347806 | 12/1992 |
| JP | 4-356004 | 12/1992 |
| JP | 3-87048 | 4/1993 |
| JP | 6-34845 | 2/1994 |
| JP | 6-148464 | 5/1994 |
| JP | 7-46888 | 10/1995 |

* cited by examiner

Primary Examiner—Neil Abrams
Assistant Examiner—Phuong KT Dinh
(74) Attorney, Agent, or Firm—McDermott, Will & Emery

(57) ABSTRACT

The guide pin (P) in accordance with the present invention is a guide pin (P) having a predetermined pin diameter to be inserted into a guide pin insertion hole (9) of a ferrule (11); which is configured to have an inserting portion (31) penetrating through the ferrule (11), and an engagement portion (32), having a diameter greater than that of the guide pin insertion hole (9), adapted to abut against the back face (11b) of the ferrule (11).

6 Claims, 16 Drawing Sheets

GUIDE PIN FOR OPTICAL FIBER CONNECTORS AND OPTICAL FIBER CONNECTOR PLUG

TECHNICAL FIELD

The present invention relates to an optical connector guide pin to be utilized for coupling optical connector plugs to each other upon optical interconnection, and an optical connector plug having such a guide pin.

BACKGROUND ART

Conventionally, as a technique in such a field, Japanese Patent Application Laid-Open No. HEI 6-34845 has been known. The optical connector plug disclosed in this publication has a ferrule of a rectangular parallelepiped form, and an optical fiber exposed from a tip of a ribbon fiber is fixed to this ferrule. Also, the ferrule has two guide pin insertion holes each extending in the optical fiber insertion direction and penetrating therethrough from the front face to the back face, while a guide pin is inserted in each guide pin insertion hole. Further, the optical connector plug has a damper disposed behind the ferrule, which prevents the guide pin from dropping out of the ferrule. Specifically, the rear end part of each guide pin is formed with a constricted portion, which is fitted into an insertion hole formed between engagement lugs of the clamper, thereby preventing the guide pin from dropping out. Also, when the optical connector plug is used in a place where the guide pin is strongly desired to be prevented from dropping out, the guide pin and the damper are secured with an adhesive.

However, since the conventional optical connector plugs are configured as mentioned above, there have been problems as follows. Namely, in order to prevent the guide pin from easily dropping out of the ferrule, the guide pins and the damper have been machined into complicated forms, and it has been necessary to strictly manage the dimensions of the constricted portion of the guide pin and the insertion hole in the damper in order to maintain the clamping force of the damper with respect to the guide pin. Also, when the guide pin is strongly desired to be prevented from dropping out, the guide pin has been secured with an adhesive, thus increasing the cost. Further, when inserting the guide pin into the guide pin insertion hole of the ferrule, if the guide pin is inserted from the front face side of the ferrule, there has been a possibility that the tip of the guide pin may damage the front face of the ferrule, thereby deteriorating the quality of the ferrule.

In order to overcome the above-mentioned problems, it is an object of the present invention to provide a guide pin and an optical connector plug which facilitate simplification of the structure, make it possible to cut down the cost, and contribute to maintaining the quality of the ferrule.

DISCLOSURE OF THE INVENTION

The optical connector guide pin in accordance with the present invention is an optical connector guide pin having a predetermined pin diameter to be inserted into a guide pin insertion hole of a ferrule; wherein the guide pin comprises an inserting portion penetrating through the ferrule, and an engagement portion, having a diameter greater than that of the guide pin insertion hole, adapted to abut against a back face of the ferrule.

Since the rear end part of the guide pin is provided with the engagement portion formed greater than the guide pin insertion hole; when the guide pin is attached to the ferrule, the engagement portion can prevent the guide pin from forwardly dropping out. Also, when such a guide pin is to be projected from the front face of the ferrule by a predetermined amount, the tip of the guide pin would be inserted into the guide pin insertion hole from the back face side of the ferrule. Namely, this guide pin is not expected to be inserted from the front face side of the ferrule, whereby the tip of the guide pin would not damage the front face of the ferrule nor chip off the guide pin hole during the operation of inserting the guide pin into the ferrule. Also, changing the position of the engagement portion can easily alter the amount of projection of the tip portion of the guide pin from the ferrule.

An optical connector plug in accordance with the present invention is an optical connector plug comprising a ferrule having there with in an optical fiber aligning portion for aligning a plurality of optical fibers and guide pin insertion holes penetrating therethrough from a front face to a back face on both sides of the optical fiber aligning portion, in which the optical fibers are secured to the optical fiber aligning portion, and a guide pin is inserted in each guide pin insertion hole; wherein the guide pin has an inserting portion penetrating through the ferrule, and an engagement portion, having a diameter greater than that of the guide pin insertion hole, adapted to abut against the back face of the ferrule.

In this optical connector plug, a simple operation of just inserting the guide pin into the guide pin insertion hole from the back face side of the ferrule can achieve positioning of the guide pin with respect to the ferrule, thus contributing to improvement in the workability of assembling.

An optical connector plug in accordance with the present invention is an optical connector plug having a ferrule pressed outward by a spring member in a ferrule accommodating space disposed at a front end portion of a ferrule housing, so as to peep from an outlet opening of the ferrule accommodating space, holding the ferrule in a floating state within the ferrule accommodating space, and projecting a tip portion of a guide pin from a guide pin insertion hole formed in the ferrule; wherein the guide pin comprises an inserting portion penetrating through the ferrule, and an engagement portion, having a diameter greater than that of the guide pin insertion hole, adapted to abut against a back face of the ferrule, and wherein a stopper is disposed between the engagement portion and the spring member, the stopper abutting against a rear end face of the guide pin while in a state separated from the ferrule.

This optical connector plug has a configuration in which the spring member is utilized for outwardly pressing the ferrule. This is a structure for improving the connectivity between the end faces of ferrules upon plugging by way of the guide pin. Also, as a stopper is disposed between the ferrule and the spring member, the ferrule is kept from being directly pushed by the spring member, whereby the ferrule can appropriately be prevented from being broken or chipped off by the spring member. Further, the stopper inhibits the guide pin from retracting. For example, when coupling ferrules to each other by way of the guide pin, the stopper inhibits the guide pin from retracting as its tip abuts against the front face of the opposed ferrule.

BEST MODE FOR CARRYING OUT THE INVENTION

In the following, preferred embodiments of the optical connector guide pin and optical connector plug in accordance with the present invention will be explained in detail with reference to the drawings.

Figure 1:
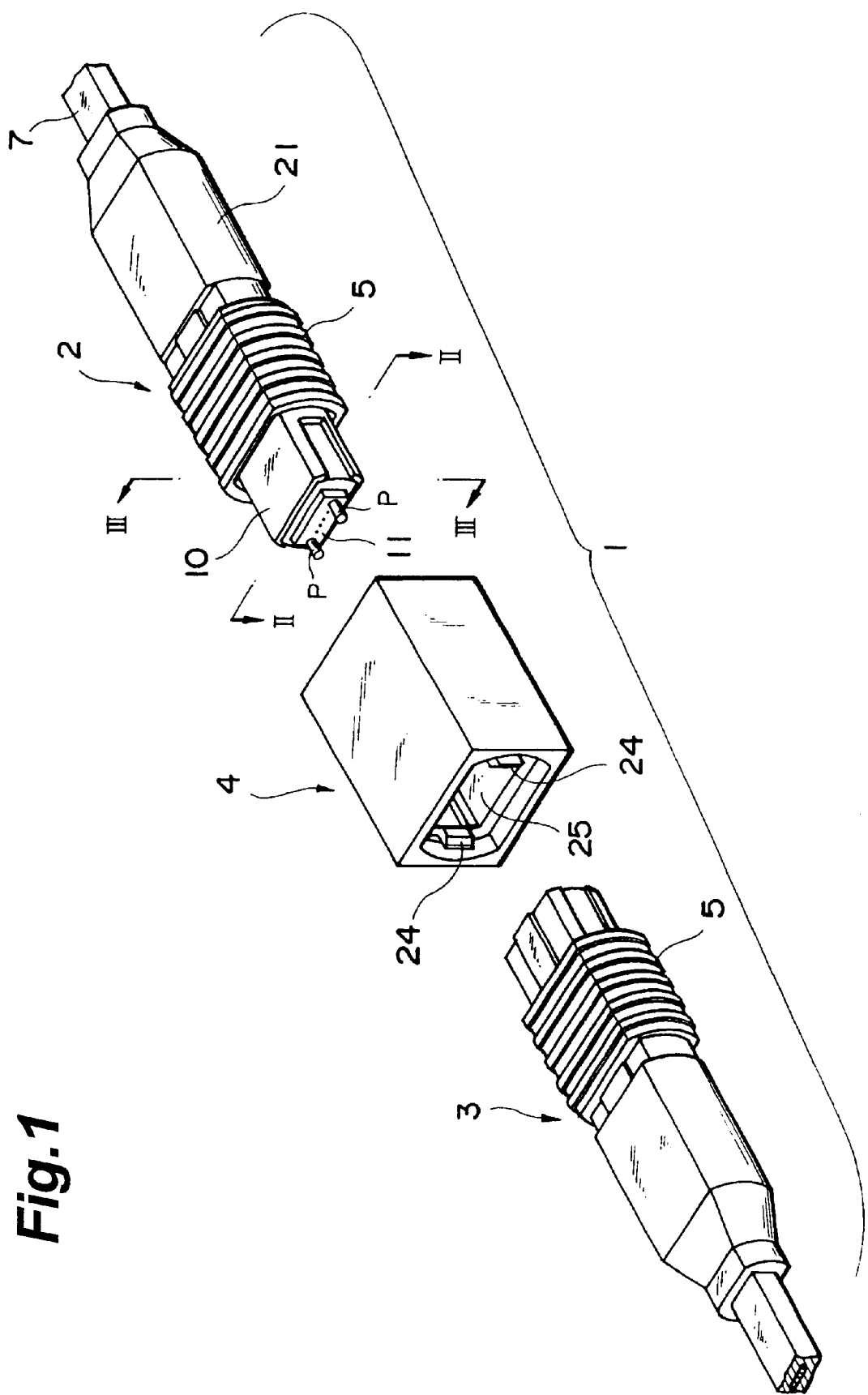
FIG. 1 is a perspective view showing an embodiment of an optical connector to which an optical connector plug in accordance with the present invention is applied.

FIG. 1 is a perspective view showing an optical connector. The optical connector 1 shown in this drawing is a push-pull type optical connector. Namely, just pushing a pair of optical connector plugs 2, 3 into an adapter 4 achieves plugging by way of the adapter 4 in a single motion. Also, the individual optical connector plugs 2, 3 can easily be taken out from the adapter 4 by pulling them out while pinching ejectors (knobs) 5, 5 provided in the optical connector plugs 2, 3 with fingers. In the following, structures of the individual optical connector plugs 2, 3 and adapter 4 will be explained.

Figure 2:
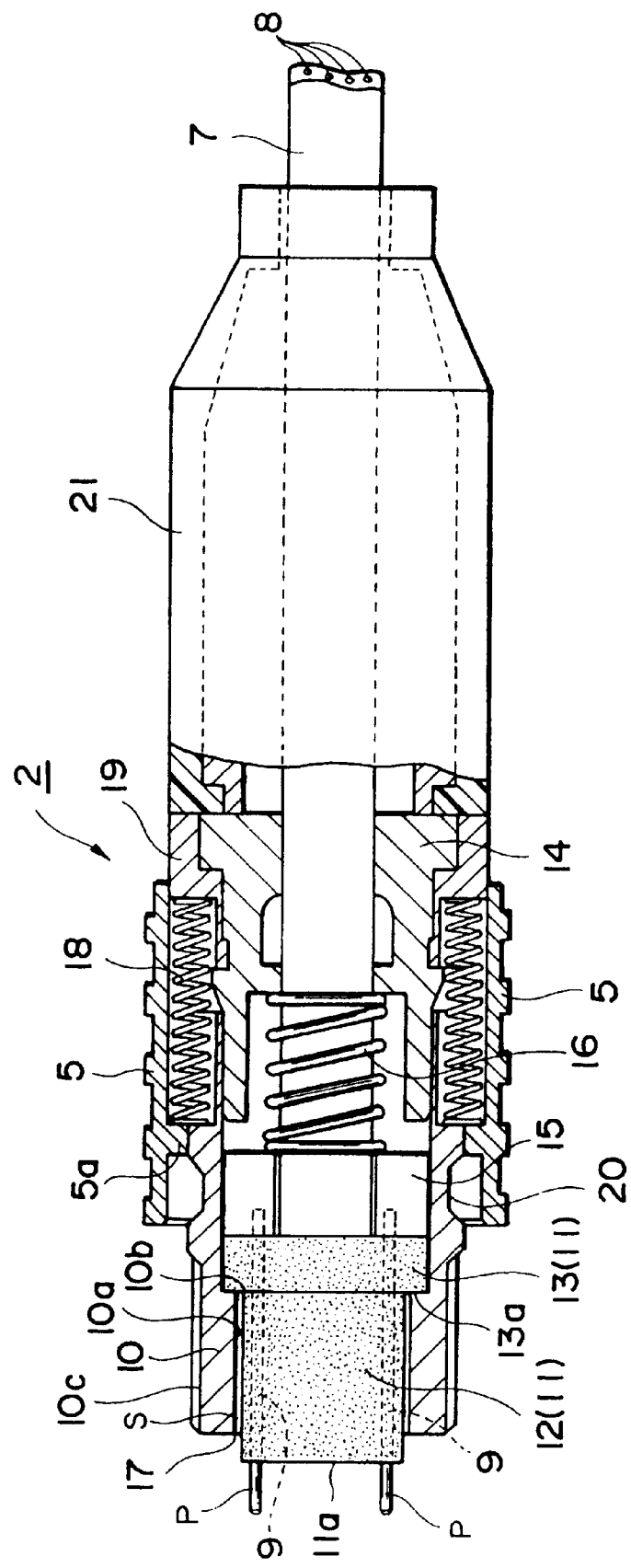
FIG. 2 is a sectional view of the optical connector plug shown in FIG. 1, taken along the line II—II.
Figure 3:
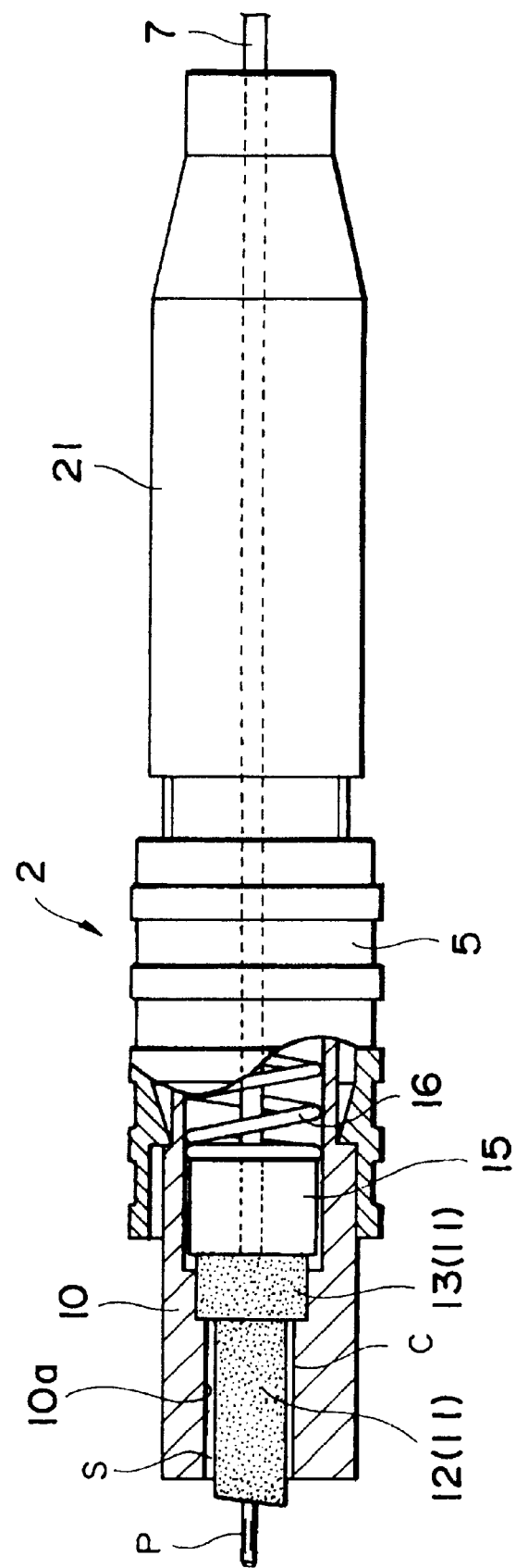
FIG. 3 is a sectional view of the optical connector plug shown in FIG. 1, taken along the line III—III.

As shown in FIGS. 2 and 3, the optical connector plug 2 has a sleeve-shaped housing 10, whereas a ferrule 11 made of a plastic is accommodated within the housing 10. Specifically, a ferrule accommodating space S having a rectangular cross section is formed at a front end portion of the housing 10, whereas a ferrule main body 12 having a quadrangular prism form is accommodated within the ferrule accommodating space S. Also, the rear end of the ferrule 11 is provided with a projection 13, which has a front end face 13a abutting against a stepped abutment face 10b formed in the inner wall face 10a of the housing 10.

Further, the optical connector plug 2 has a hollow holder 14 secured to the rear end of the housing 10. In front of the holder 14, a stopper 15 which will be explained later is disposed. The stopper 15 is caused to abut against the projection 13 of the ferrule 11, so that the stopper 15 and the holder 14 are separated from each other, whereas a coil spring 16, as a ferrule-pressing spring member, is disposed in the resulting gap. As a result, the ferrule is forwardly pressed due to the urging force of the spring 16, whereby the front end face 13a of the projection 13 of the ferrule 11 is pressed against the abutment face 10b provided in the inner wall face 10a of the housing 10.

Hence, if the stepped abutment face 10b is utilized as the reference surface, then the positioning of the ferrule 11 is reliably achieved within the housing 10, and the ferrule 11 can securely be held with the housing 10 while in a state where the front end portion of the ferrule 11 slightly peeps from the outlet opening 17 of the ferrule accommodating space S. Here, guide pins P are arranged within their respective guide pin holes 9 penetrating through the ferrule 11 in its longitudinal direction (coupling direction), such that the tip of each guide pin P projects from the connection end face (front face) 11a of the ferrule 11.

Further, the optical connector plug 2 has the sleeve-shaped ejector 5 located at the outer periphery of the housing 10 and holder 14, which is slidable in the longitudinal direction of the housing 10. The ejector 5 is forwardly pressed by coil springs 1P for the ejector. Specifically, each coil spring 18 is disposed between a spring bearing 19 secured to the outer peripheral face of the rear portion of the holder 14 and a protrusion 5a formed on the inner peripheral face of the ejector 5, and forwardly stresses the ejector 5.

Consequently, as the ejector 5 is moved back while being pinched with fingers, it retracts against the spring forces of the coil springs 18; and, when the fingers are released, the ejector 5 moves forward due to the spring forces. In the vicinity of the tip of the ejector 5, the outer wall face 10c of the housing 10 is formed with claw-engaging depressions 20 for engaging claws 23 (see FIG. 4) of the adapter 4.

Here, optical fibers 8 having a plurality of cores (e.g., four cores) are embedded within a ribbon fiber 7, which extends from the rear end of the ferrule 11 through the optical connector plug 2 to the outside. Secured to a rear portion of the optical connector plug 2 is a boot 21, which protects the ribbon fiber 7.

Figure 4:
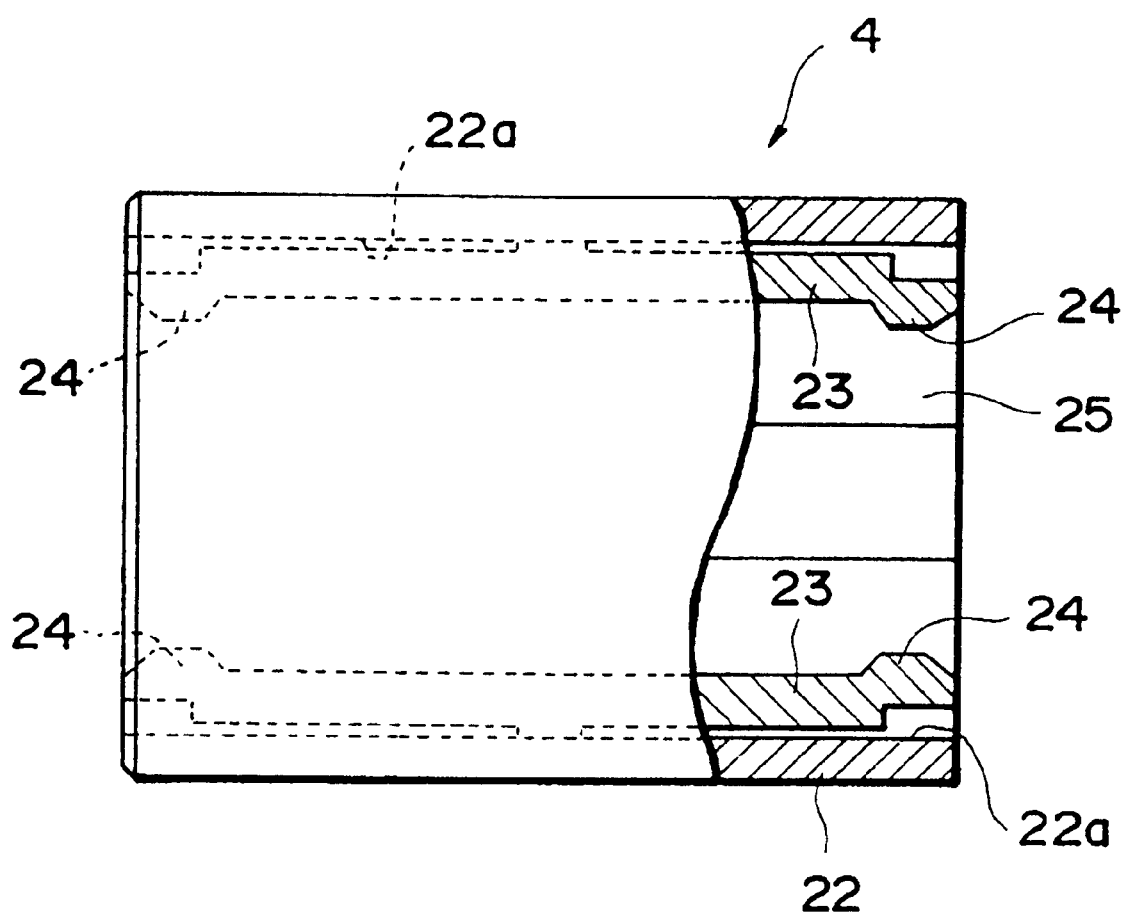
FIG. 4 is a partly cutaway sectional view of an adapter.

As shown in FIG. 4, the adapter 4 for receiving thus configured optical connector plug 2 has a through hole 25 therewith in for inserting the housing 10 of the optical connector plug 2, and the through hole 25 is formed with a protective cover 22 made of a plastic. On the inner wall face 22a side of the protective cover 22, a pair of claws 23 having a springiness extend over the whole length of the through hole 25 in a cantilever state, whereas the tip of each claw 23 is formed with a protrusion 24 adapted to engage the claw-engaging depression 20 of the optical connector plug 2. The protrusions 24 are formed at both ends of each claw 23, since the optical connector plug 2 and the optical connector plug 3 (see FIG. 1) are expected to be inserted into the through hole 25 of the adapter 4 from both sides.

The coupling of the optical connector plug 2 and the optical connector plug 3 by way of the above-mentioned adapter 4 will now be explained briefly. Since the optical connector plug 3 has substantially the same configuration as that of the optical connector plug 2, they will be explained with the same reference numerals or letters.

Figure 5:
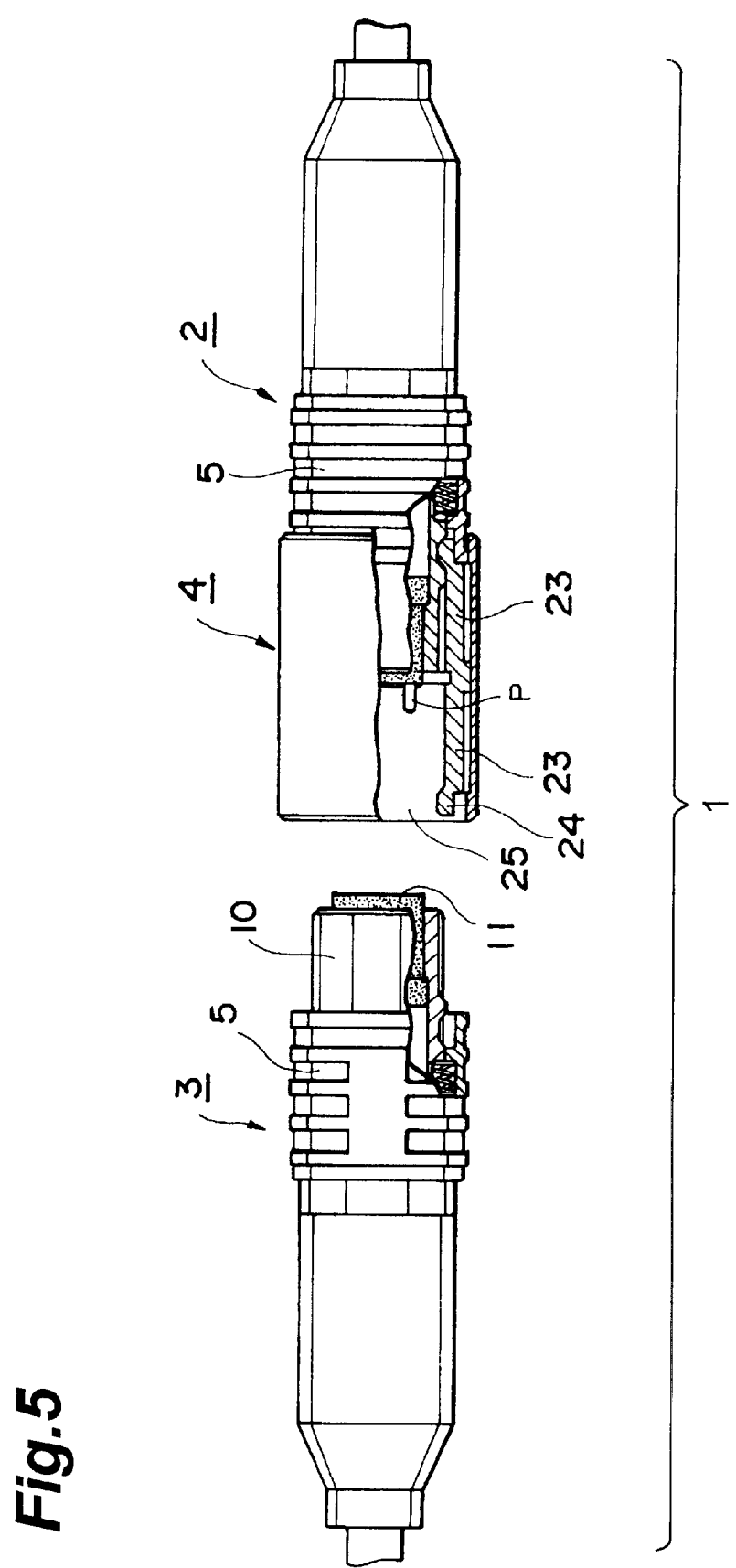
FIG. 5 is a partly cutaway sectional view showing a state where one of optical connector plugs is inserted into the adapter.
Figure 6:
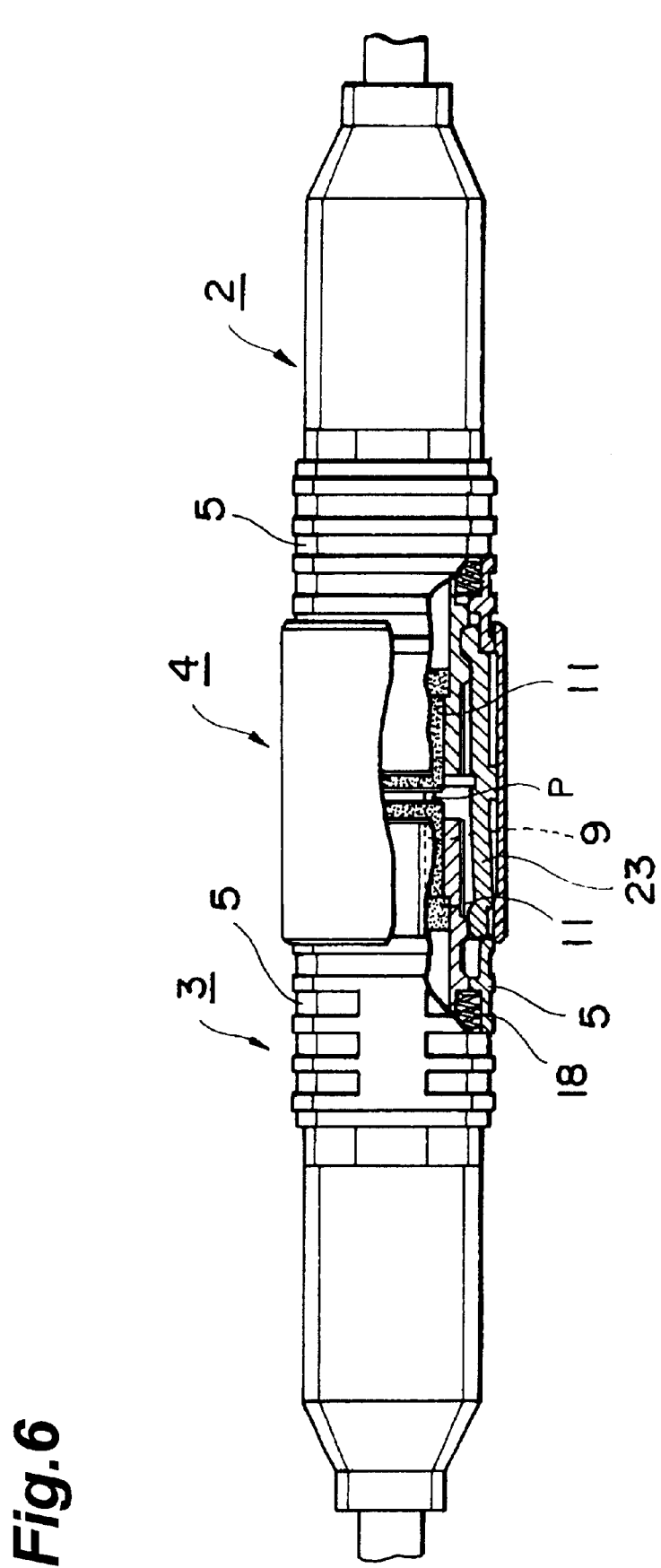
FIG. 6 is a partly cutaway sectional view showing a state where the other optical connector plug is in the process of being inserted into the adapter.

First, as shown in FIG. 5, the optical connector plug 2 is inserted into the through hole 25 of the adapter 4 from one side thereof, so as to be secured to the adapter 4, thereby positioning the ferrule 11 of the optical connector plug 2 within the adapter 4. Thereafter, as shown in FIG. 6, the optical connector plug 3 is inserted into the through hole 25 of the adapter 4 from the other side, whereby the guide pins P disposed at the ferrule 11 of the connector plug 2 enter their corresponding guide pin holes 9 formed in the ferrule 11 of the optical connector plug 3. Then, as the optical connector plug 3 is pushed into the adapter 4, the respective end portions of the claws 23 keep retracting the ejector 5 against the spring forces of the coil springs 18 while abutting against the ejector 5.

Figure 7:
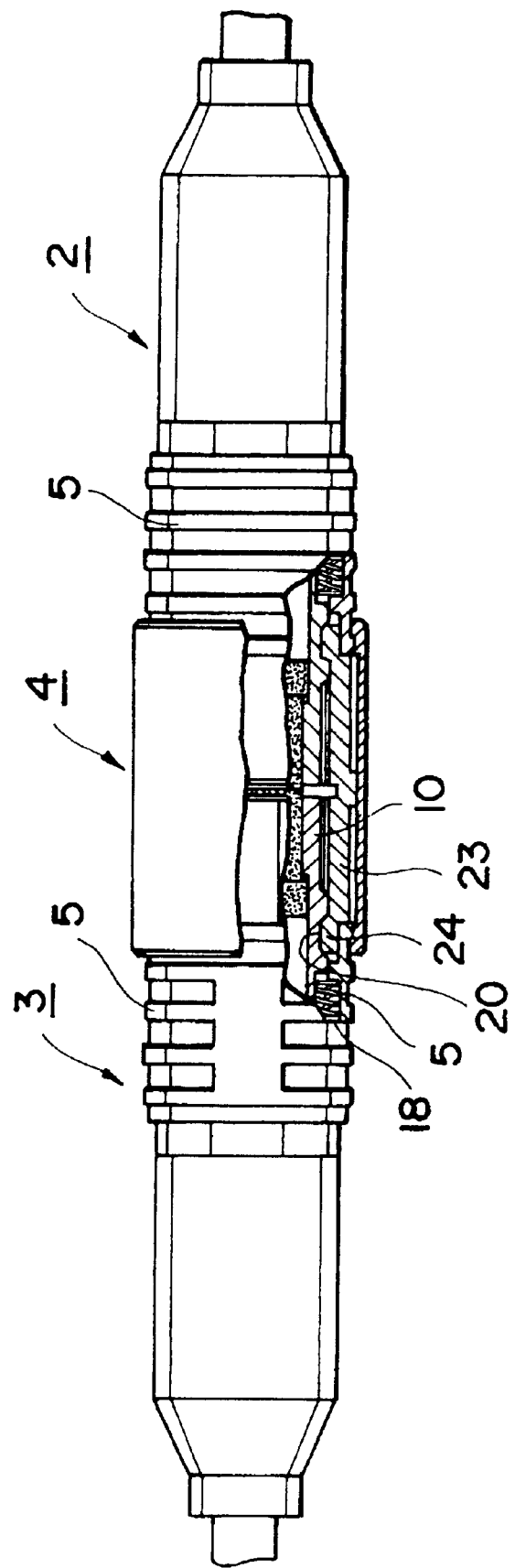
FIG. 7 is a partly cutaway sectional view showing a state where both of the optical connector plugs are completely inserted into the adapter.

Thereafter, as shown in FIG. 7, at the same time when the protrusions 24 disposed at the tips of the claws 23 enter their corresponding claw-engaging depressions 20 of the optical connector plug 2, the ejector 5 is released from the claws 23, so that the ejector 5 returns due to the spring forces of the coil springs 18, thereby pressing the protrusions 24 of the claws 23 from there above. As a result, the claws 23 of the adapter 4 and the housing 10 of the optical connector plug 3 securely engage each other, thereby achieving dropout prevention for the optical fiber plug 3 with respect to the adapter 4. At the same time when this dropout prevention is completed, an end-face junction between the ferrule 11 of the optical connector plug 2 and the ferrule 11 of the optical connector plug 3 is completed within the adapter 4.

An assembling operation similar to that mentioned above is also carried out when inserting the optical connector plug 2 into the adapter 4. When removing the optical connector plug 2 and the optical connector plug 3 from the adapter 4, if they are pulled out while the ejectors (knobs) 5 are pinched with fingers, then the pressing of the claws 23 by the ejectors 5 is released, whereby the individual optical connector plugs 2, 3 can easily be taken out from the adapter 4.

For smoothly connecting the optical connector plugs 2, 3 by way of the adapter. 4, each optical connector plug 2, 3 employs a floating structure in which the ferrule 11 can be moved within the housing 10. Namely, as shown in FIGS. 2 and 3, the ferrule 11 is accommodated in the ferrule accommodating space S of the housing 10 with a predetermined clearance C.

Figure 8:
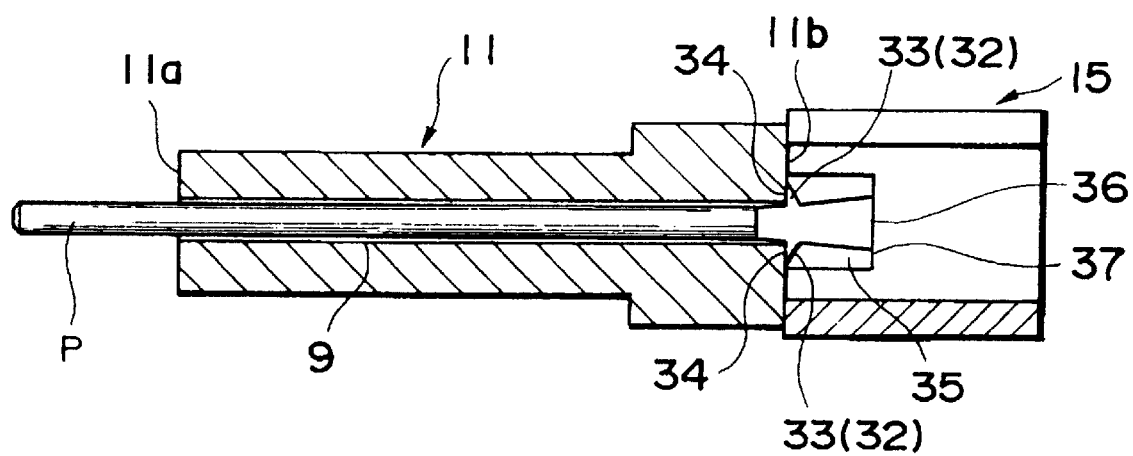
FIG. 8 is a sectional view showing a ferrule and a stopper which are utilized in the optical connector plug in accordance with the present invention.
Figure 9:
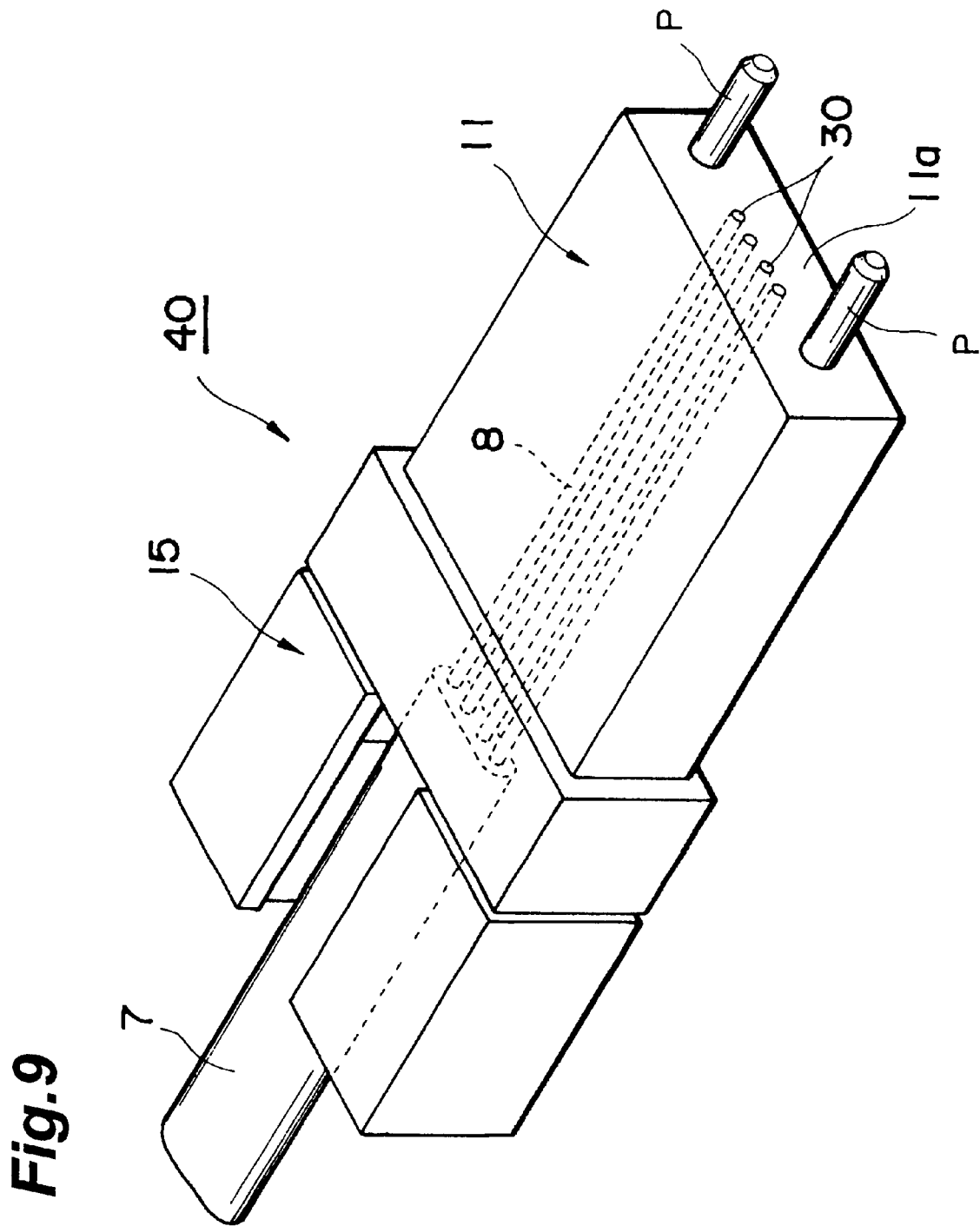
FIG. 9 is a perspective view showing a state where the ferrule and the stopper are assembled together.

Here, as shown in FIGS. 8 and 9, the ferrule 11 is formed with two guide pin insertion holes 9 each having a borediameter of 700 $\mu$m, whereas a plurality of (e.g., four) optical fiber insertion holes 30, as an optical fiber aligning portion, are formed between the two guide pin insertion holes 9 in parallel therewith. The optical fiber aligning portion may also be formed like a groove. The four optical fibers 8 projecting from the tip portion of the ribbon fiber 7 are inserted into the respective optical fiber insertion holes 30, whereas the guide pins P made of SUS are inserted into the respective guide pin insertion holes 9. The tip portion of each guide pin P projects from the connection end face (front face) 11a of the ferrule 11 by a predetermined amount.

Figure 10:
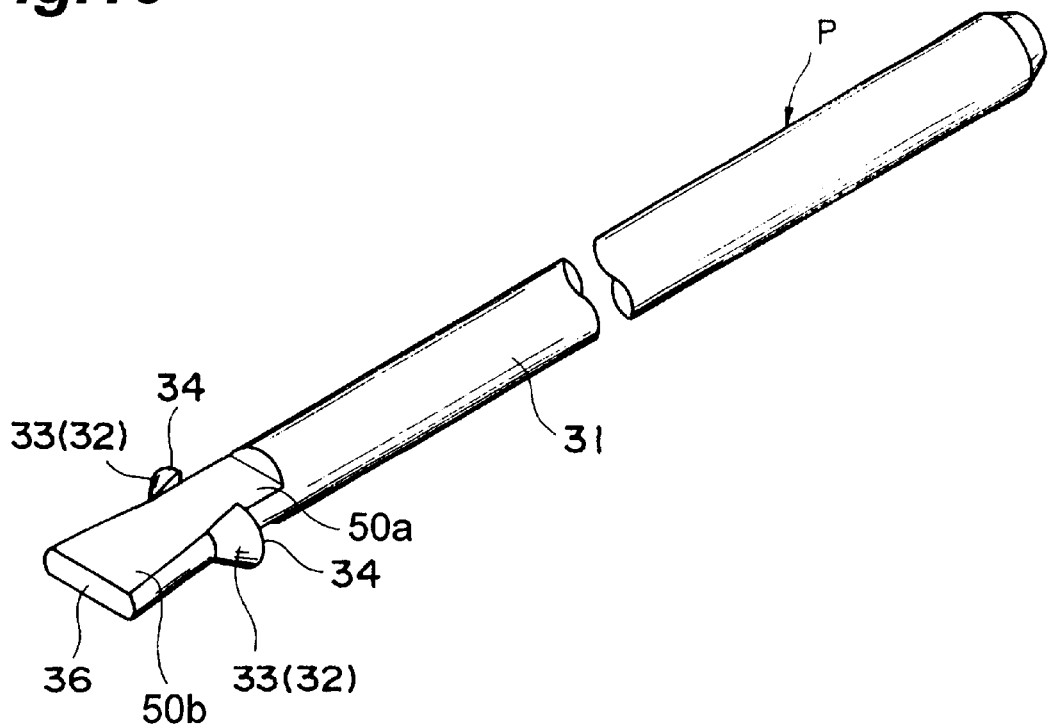
FIG. 10 is a perspective view showing a first embodiment of the guide pin in accordance with the present invention.
Figure 11:
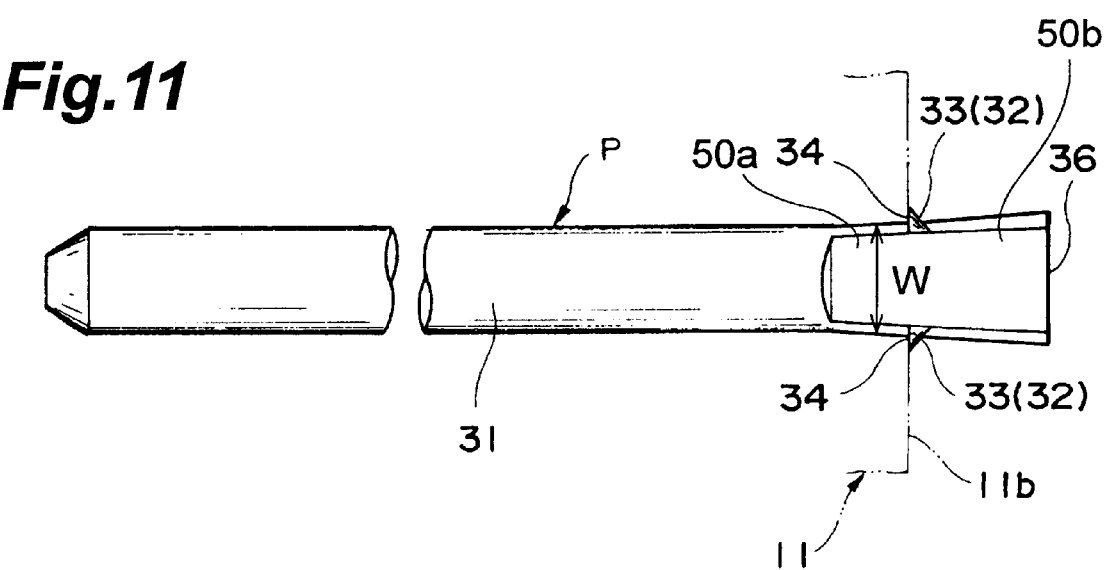
FIG. 11 is a plan view of the guide pin shown in FIG. 10.
Figure 12:
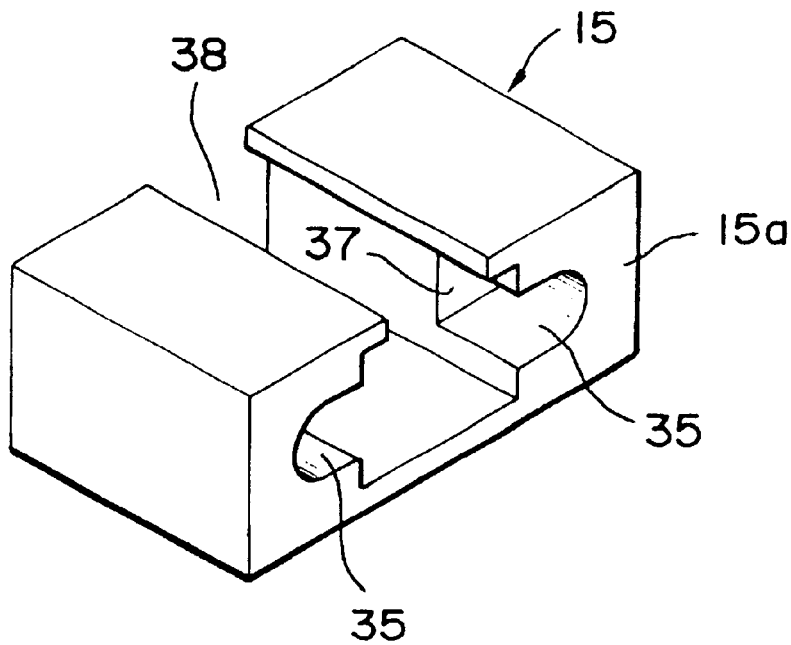
FIG. 12 is a perspective view of the stopper shown in FIG. 9.
Figure 13:
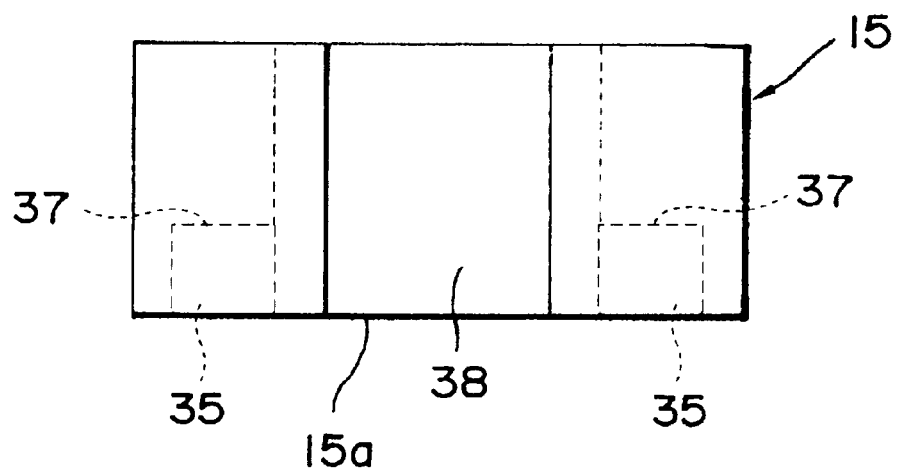
FIG. 13 is a plan view of the stopper shown in FIG. 12.
Figure 14:
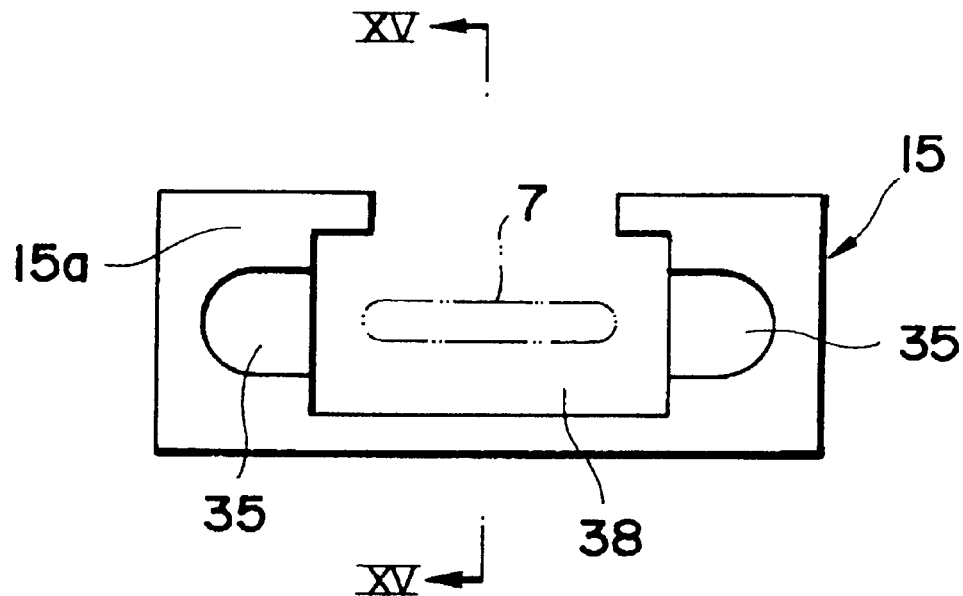
FIG. 14 is a front view of the stopper shown in FIG. 12.
Figure 15:
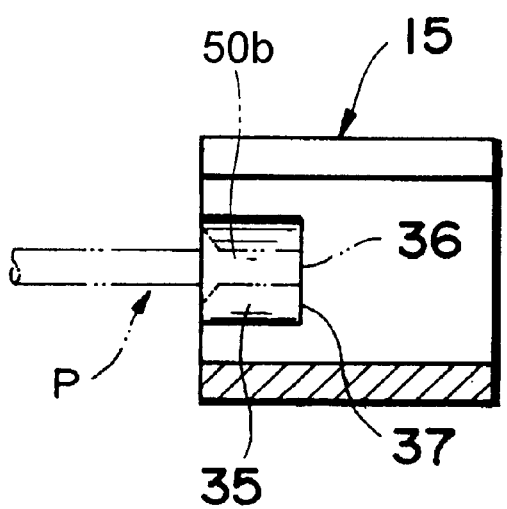
FIG. 15 is a sectional view taken along the line XV—XV of FIG. 14.

As shown in FIGS. 10 and 11, each guide pin P has a cylindrical inserting portion 31 with a pin diameter of 699 $\mu$m penetrating through the ferrule 11, whereas a rear end portion of the guide pin P is formed with an engagement portion 32 for abutting against the back face 11b of the ferrule 11. The engagement portion 32 comprises two fins 33 radially projecting from the peripheral face of the guide pin P, each having a form which is a half of a circular cone divided into two along its axis of rotation, whereas each fin 33 radially projects beyond the pin diameter of the guide pin P. This engagement portion 32 is formed such that regions each having a length on the order of 1 to 2 mm in the rear end portion of the guide pin P project to both lateral sides from a flat portion which is flattened to a thickness of about 500 $\mu$m by pressing. Upon this pressing, an unshown press surface is formed with a depression having substantially the same shape as that of the rear end portion of the guide pin P, by which the fins 33 each constituting the half of the circular cone are integrally formed with the guide pin P on both side of the rear end portion. The front side of each fin 33 is formed with a substantially semicircular positioning part 34 abutting against the back face 11b of the ferrule 11, and the positioning part 34 is formed as a surface parallel to the back face 11b of the ferrule 11.

Therefore, as shown in FIG. 8, when the guide pin P is attached to the ferrule 11, the positioning part 34 of the fin 33 abuts against the back face 11b of the ferrule 11, there by reliably preventing the guide pin P from forwardly dropping out. Also, when the guide pin P having such a form is loaded into the guide pin insertion hole 9 from the back face 11b side of the ferrule 11, the tip of the guide pin P would be inserted therein. Namely, the guide pin P is not expected to be inserted into the ferrule 11 from the front face 11a side, whereby the tip of the guide pin P would not damage the front face 11a of the ferrule 11 nor chip off the guide pin hole 9 during the operation of inserting the guide pin P into the ferrule 11.

Also, as shown in FIGS. 10 and 11, a protrusion 50b projecting rearward from the fin 33 and a widened portion 50a having a width W adapted to closely engage the wall face of the guide pin insertion hole 9 between the inserting portion 31 and the fin 33 are integrally formed with each other in a flat form by pressing. As a consequence, when the width W of the widened portion 50a is formed slightly greater than the guide pin insertion hole 9, and is pushed into the latter, it closely engages the wall face of the guide pin insertion hole 9, thereby appropriately preventing the guide pin P from rattling and from dropping out. Changing the position of the fins 33 can easily alter the amount of projection of the guide pin P from the ferrule 11.

Here, the dropout strength of the guide pin P having the above-mentioned configuration was measured. Then, a guide pin secured to a ferrule by an adhesive alone as in a conventional case dropped out of the ferrule at a force of about 1 kgf. By contrast, the guide pin P of the present invention did not drop out even when a force of 10-odd kgf was applied thereto, whereby a very high dropout strength was experimentally verified.

Thus configured guide pin P would also project from the back face 11b side of the ferrule 11. Therefore, as shown in FIGS. 12 to 15, the front face 15a of the stopper 15 made of a resin is formed with a depression 35 for accommodating the projecting portion 50b of the guide pin P projecting from the back face 11b of the ferrule 11. Also, the inner wall face of depression 35 is formed with a stopper surface 37 opposing to and abutting against the rear end face 36 of the guide pin P. Therefore, as the rear end face 36 of the guide pin P is pressed against the stopper surface 37, the guide pin P is appropriately inhibited from retracting. It will be sufficient if the depression 35 has a simple dent form, and its form is not restricted in particular as long as it has such dimensions that the rear end portion of the guide pin P can be accommodated therein.

Also, when the stopper 15 is caused to abut against the back face 11b of the ferrule 11, the stopper surface 37 would abut against the rear end face 36 of the guide pin P (see FIG. 8). As a consequence, the guide pin P would not rattle in the axial direction of the guide pin insertion hole 9, and the position of the guide pin P with respect to the ferrule 11 is always kept in a constant state even when a load is externally applied to the guide pin P. Formed at the center of the stopper 15 is a ribbon fiber guiding groove 38 for rearwardly drawing out the ribbon fiber 7 secured to the ferrule 11.

Figure 21:
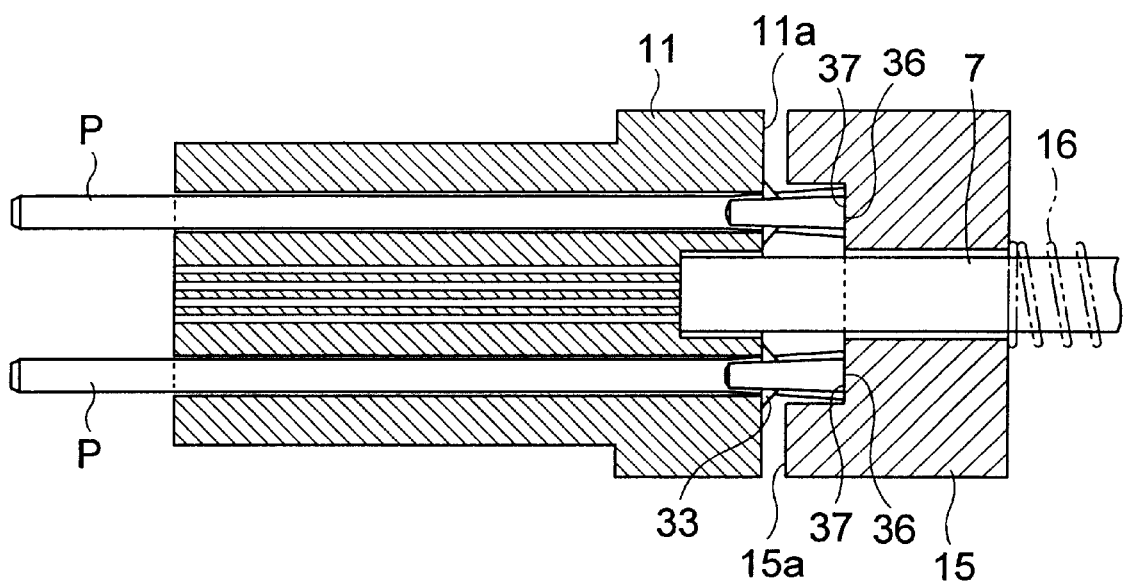
FIG. 21 is a sectional view showing a state where a ferrule and a stopper which are utilized in the optical connector plug in accordance with the present invention are separated from each other.

Here, as shown in FIG. 21, the back face 11b of the ferrule 11 and the front face 15a of the stopper 15 may be separated from each other by about 0.1 mm. In this case, the rear end face 36 of the guide pin P abuts against the stopper surface 37 of the depression 35 of the stopper 15. As a result, the spring force of the coil spring 16 would not directly be transmitted to the ferrule 1, whereby it is possible to attain a configuration in which the spring force is indirectly transmitted to the ferrule 11 by way of a pair of right and left guide pins P. Consequently, the spring force of the coil spring 16 can be transmitted to the ferrule 11 efficiently, uniformly, and reliably.

Figure 16:
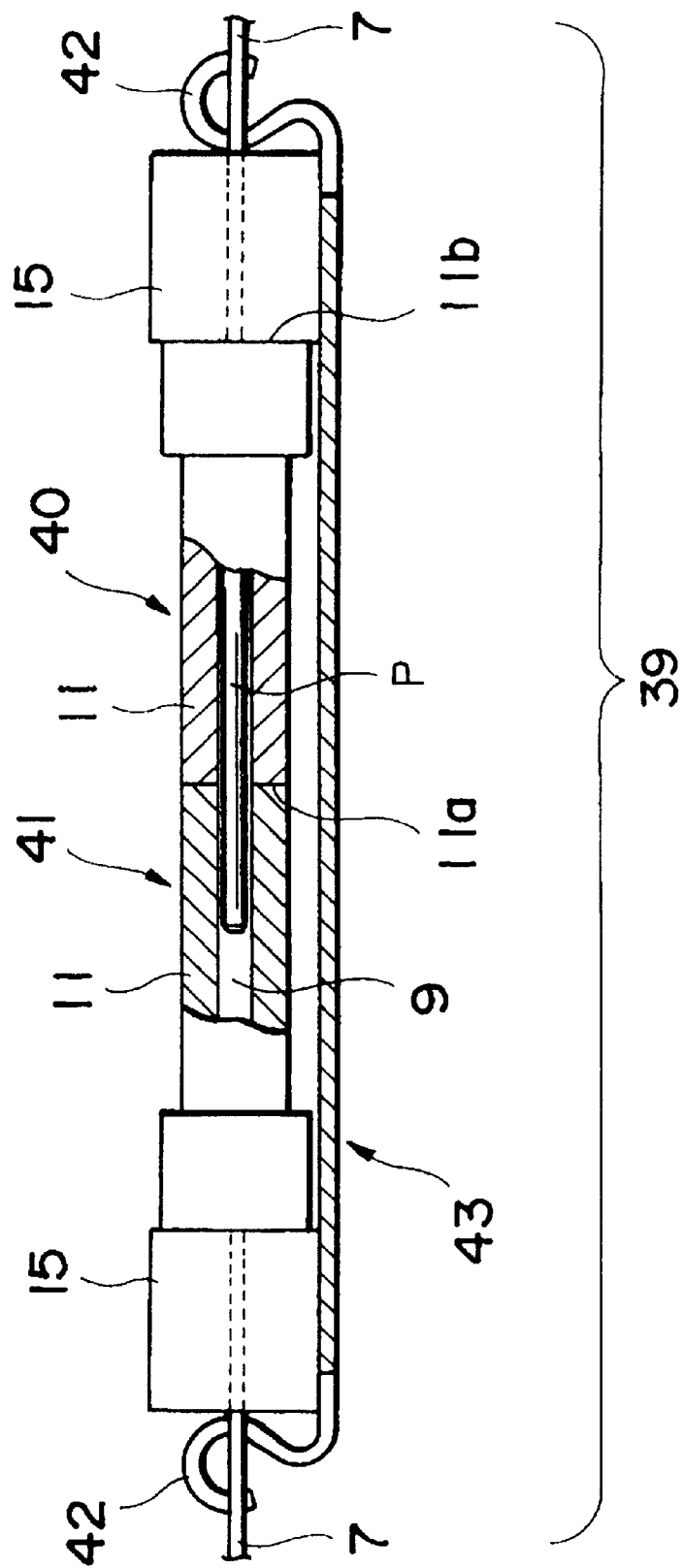
FIG. 16 is a sectional view showing another embodiment of the optical connector to which the optical connector plug in accordance with the present invention is applied.

Another embodiment of the optical connector will now be explained. As shown in FIG. 9, an optical connector plug 40 composed of a combination of the ferrule 11 and the stopper 15 is constituted as one part of an optical connector 39. The optical connector plug 40 shown in this drawing is utilized as a male optical connector plug of the optical connector 39, whereas a female optical connector plug 41 shown in FIG. 16 exists as the other part of the optical connector 39. Namely, guide pins P are secured to the male optical connector plug 40, whereas the female optical connector plug 41 is provided with guide pin insertion holes 9, whereby the optical connector plugs 40 and 41 differ from each other in whether there are guide pins P or not. As a matter of course, the guide pins P having configurations similar to those in the above-mentioned optical connector plug 2 are attached to the ferrule of the optical connector plug 40. For keeping the state of coupling between the male optical connector plug 40 and the female optical connector plug 41, a clip 43 having spring type pressing portions at both ends is utilized.

Figure 17:
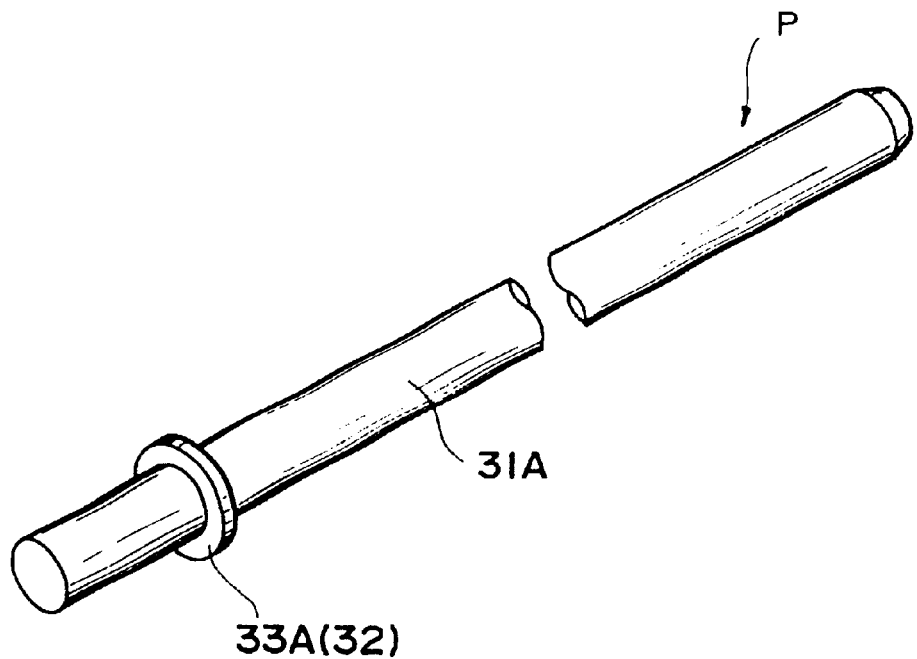
FIG. 17 is a perspective view showing a second embodiment of the guide pin in accordance with the present invention.
Figure 18:
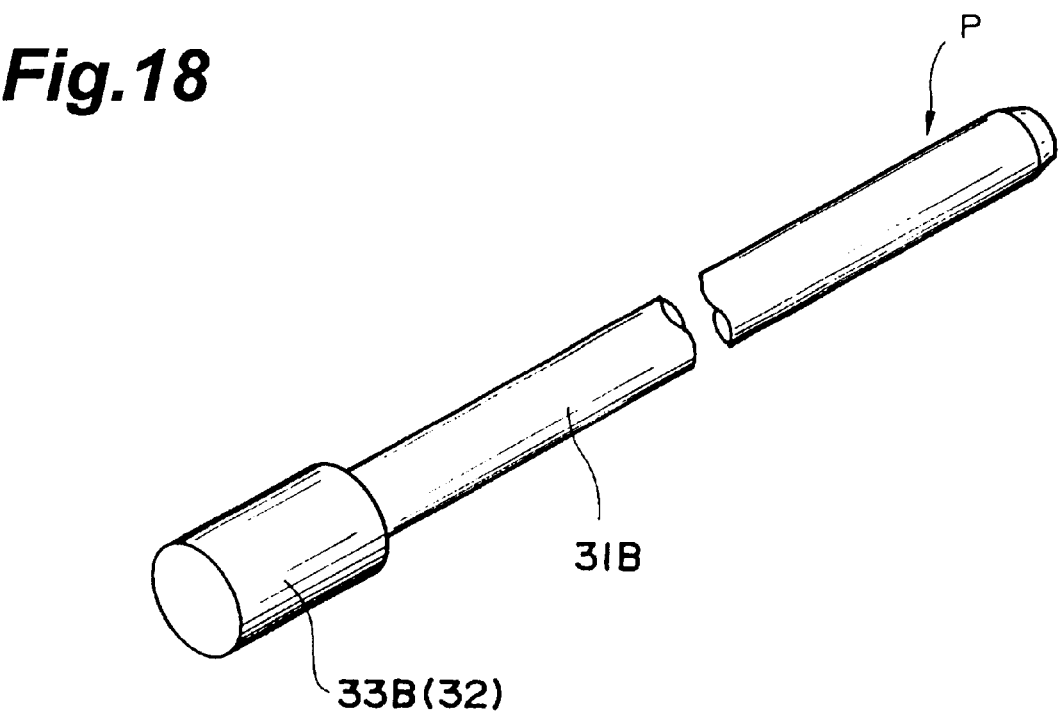
FIG. 18 is a perspective view showing a third embodiment of the guide pin in accordance with the present invention.
Figure 19:
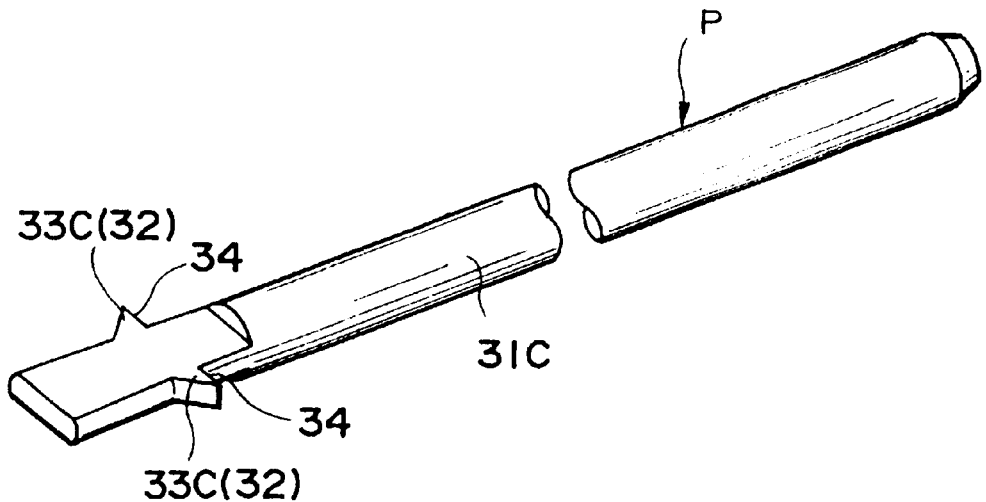
FIG. 19 is a perspective view showing a fourth embodiment of the guide pin in accordance with the present invention.
Figure 20:
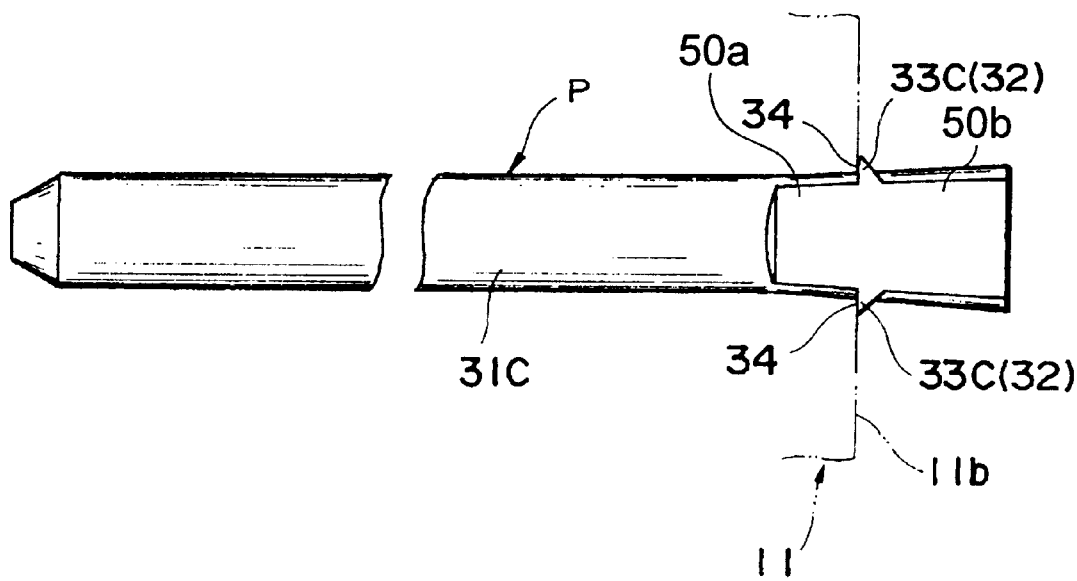
FIG. 20 is a plan view of the guide pin shown in FIG. 19.

The guide pin P in accordance with the present invention is not limited to the above-mentioned embodiments. For example, as shown in FIG. 17, in the middle of a cylindrical inserting portion 31A, an engagement portion 32 maybe formed, as a disk-shaped flange 33A, at a rear end portion of the guide pin P. Also, as shown in FIG. 18, continuously with a cylindrical inserting portion 31B, an engagement portion 32 may be formed, as a cylindrical flange 33B, at the rear end portion of the guide pin P. Further, as shown in FIGS. 19 and 20, in the middle of a cylindrical inserting portion 31C, an engagement portion 32 may be formed as triangular fins 33C.

INDUSTRIAL APPLICABILITY

The guide pin in accordance with the present invention facilitates simplification of the structure, makes it possible to cut down the cost, and contributes to maintaining the quality of a ferrule. The optical connector plug in accordance with the present invention having a guide pin with such a configuration is similar thereto.

What is claimed is:

1. An optical connector plug having:
   a ferrule having:
      a back face and a front face against which the other connector plug is adapted to be abutted; and
      a guide insertion hole penetrating there through from said front face to said back face;
   a ferrule housing having a ferrule accommodating space at a front end portion thereof;
   a guide pin having an inserting portion penetrating through said ferrule from said back face to said front face, and an engaging portion having a diameter greater than that of said guide pin insertion hole and being adapted to abut against the back face of said ferrule, and a rear end portion of said inserting portion having a widened portion having a width larger than the diameter of said guide pin insertion hole;
   a spring for pressing said ferrule outward in said ferrule accommodating space, for holding said ferrule in a floating state within said ferrule accommodating space and for causing a tip portion of said guide pin to project from said guide pin insertion hole; and
   a stopper disposed between said engaging portion and said spring member, said stopper abutting against a rear end face of said guide pin and said stopper being separated from said ferrule.

2. An optical connector plug according to claim 1, wherein said stopper is formed with a depression for accommodating the rear end portion of said guide pin.

3. An optical connector plug according to claim 1, wherein said stopper is formed with a depression for accommodating the rear end portion of said guide pin.

4. An optical connector plug according to claim 1, wherein said guide pin has a protrusion projecting rearward from said engagement portion.

5. An optical connector plug according to claim 1, wherein said guide pin has, between said inserting portion and said engagement portion, the widened portion adapted to closely engage said guide pin insertion hole.

6. An optical connector plug according to claim 1, wherein said protrusion projecting rearward from said engagement portion and the widened portion adapted to closely engage said guide pin insertion hole between said inserting portion and said engagement portion have a flat form.

* * * * *